United States Patent [19]
Chen

[11] Patent Number: 6,026,543
[45] Date of Patent: Feb. 22, 2000

[54] PRESSING DEVICE AND ARRESTING DEVICE OF EXPANDABLE PULL ROD OF LUGGAGE

[76] Inventor: Shou Mao Chen, 344, Section 1. Chun Shan Road, Taichung Hsien, Taiwan

[21] Appl. No.: 09/188,296

[22] Filed: Nov. 9, 1998

[51] Int. Cl.[7] ................................................. B62B 1/00
[52] U.S. Cl. ......................... 16/113.1; 190/115; 403/377
[58] Field of Search ........................... 16/113.1; 190/115; 280/655.1, 47.315; 403/109, 377

[56] References Cited

U.S. PATENT DOCUMENTS

| | | | |
|---|---|---|---|
| 5,367,743 | 11/1994 | Chang | 16/113.1 |
| 5,694,663 | 12/1997 | Tserng | 16/113.1 |
| 5,876,048 | 3/1999 | Lee | 190/115 |
| 5,893,196 | 4/1999 | Tserng | 16/113.1 |

*Primary Examiner*—Chuck Y. Mah
*Assistant Examiner*—Donald M. Gurley
*Attorney, Agent, or Firm*—Harrison & Egbert

[57] ABSTRACT

An expandable pull rod for luggage having two bottom tubes, two middle tubes, two top tubes, a handle provided with a pressing device, and an arresting device formed of two main control members and two auxiliary control members. When the expandable pull rod is extracted, the top tubes and the middle tubes are located by the main control members of the arresting device, whereas the middle tubes and the bottom tubes are located by the auxiliary control members of the arresting device. The arresting device can be triggered by the pressing device to release the top tubes, the middle tubes and the bottom tubes when the pull rod is retracted.

1 Claim, 6 Drawing Sheets

6,026,543

PRESSING DEVICE AND ARRESTING DEVICE OF EXPANDABLE PULL ROD OF LUGGAGE

FIELD OF THE INVENTION

The present invention relates generally to an expandable pull rod of the luggage, and more particularly to a pressing device and an arresting device of the expandable pull rod of the luggage.

BACKGROUND OF THE INVENTION

Conventional luggage is generally provided with an expandable pull rod to facilitate the moving of the luggage on the floor. The conventional expandable pull rod is generally defective in design in that it can not be easily extracted or retracted, and that it can not be adjusted in length to accommodate persons of various heights.

SUMMARY OF THE INVENTION

The primary objective of the present invention is to provide an expandable pull rod of the luggage with a pressing device and an arresting device, which enable the expandable pull rod to be extracted or retracted easily. In addition, the expandable pull rod can be so expanded as to accommodate persons of various heights.

The foregoing objective, features, functions, and advantages of the present invention will be more readily understood upon a thoughtful deliberation of the following detailed description of the present invention with reference to the accompanying drawings.

DETAILED DESCRIPTION OF THE INVENTION

Figure 1:
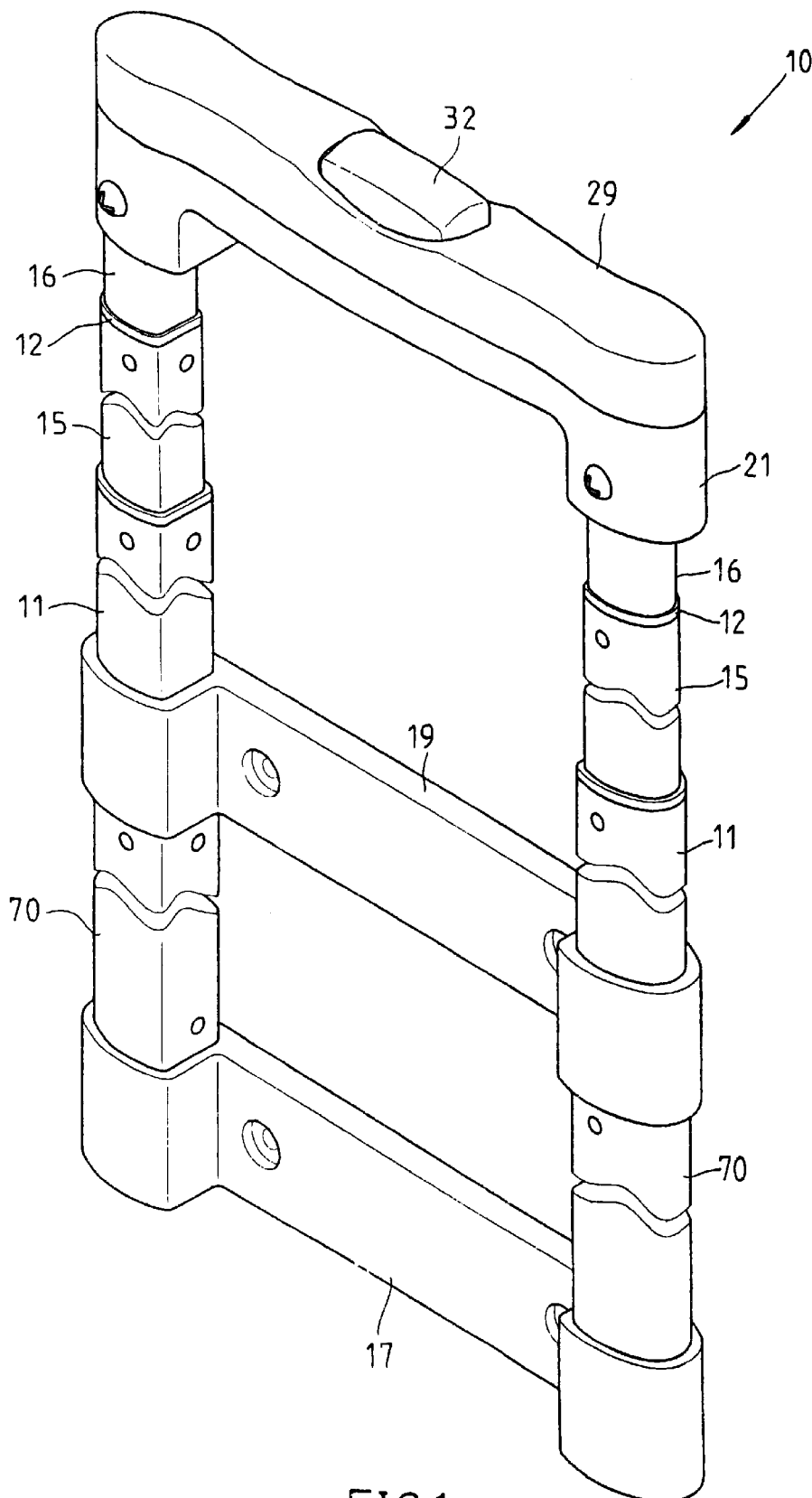
FIG. 1 shows a perspective view of the present invention.

As shown in FIGS. 1–5, and expandable pull rod 10 embodied in the present invention is intended for use in conjunction with the luggage and is composed of the component parts which are described hereinafter.

Two bottom tubes 11 of a hollow construction are respectively provided with a locating tube 12 which is fitted into the top end of the bottom tubes 11. The locating tube 12 is provided with a locating protrusion 13 capable of being located in a through hole 14 of the top end of the bottom tubes 11. The two bottom tubes 11 are provided respectively at the top and the bottom thereof with two locating holes 111, 112.

Two middle tubes 15 of a hollow construction are fitted into the bottom tubes 11 from the bottom ends of the bottom tubes 11 such that the top ends of the two middle tubes 15 are jutted out of the top ends of the bottom tubes 11, and that the top ends of the two middle tubes 15 are fitted into the locating tubes 12. The two middle tubes 15 are provided with three locating holes 151, 152, and 153.

Two top tubes 16 of a hollow construction are fitted into the middle tubes 15 from the bottom ends of the middle tubes 15 such that the top ends of the top tubes 16 are jutted out of the top ends of the middle tubes 15. The two top tubes 16 are provided with a locating hole 161.

A bottom base 17 is horizontally disposed and is provided at both ends thereof with a fitting port 18 into which the bottom end of the two bottom tubes 11 is fitted.

A middle base 19 is horizontally disposed and is provided at both ends thereof with a longitudinally-oriented opening 20 for receiving the top end of the two bottom tubes 11 in such a manner that the middle tubes 15 and the top tubes 16 are jutted out of the opening 20.

A handle 21 of an inverted U-shaped construction is provided with two arms which are fastened with the two top tubes 16. The handle 21 is provided in the interior thereof with two protruded pieces 22 and 23, which are parallel to each other, two guide slots 25 and 251, and two receiving slots 26 and 261. The handle 21 is further provided with a cover 29 which is fastened with the handle 21 by a plurality of screws 27. The cover 29 is provided with a through hole 28.

A pressing device 30 is composed of a press button 32, a cantilever spring 33, and two pull cords 34 and 341. The press button 32 is provided with two protruded pieces 35 for pivoting the cantilever spring 33 in conjunction with a pivoting pin 36. The pull cord 34 is provided with a spherical end 38 which is received in the receiving slot 26 of the handle 21 such that the spherical end 38 is extended into the interior of the top tube 16. The pull cord 341 is also provided with a spherical end 38 which is retained in the retaining slot 261 such that the spherical end 38 of the pull cord 341 is extended into the interior of the top tube 16. The press button 32 and the cantilever spring 33 are disposed in the receiving slot 24 of the handle 21 such that the two pull cords 34 and 341 are pressed by the cantilever spring 33, and that two cantilevers 37 of the cantilever spring 33 press against the bottom of the receiving slot 24, and further that the press button 32 is partially jutted out of the cover 29 via the through hole 28 of the cover 29.

An arresting device is formed of two main control members 40 which are fastened with the bottom ends of the two top tubes 16 and are composed of a seat block 41, a locating block 42, a braking block 43, a horizontal recovering spring 44 and a longitudinal recovering spring 45. The seat block 41 is provided in the interior thereof with a longitudinal hole 46, and in each of the two opposite sides thereof with a horizontal slot hole 47 in which the horizontal recovering spring 44 and the locating block 42 are disposed. The locating block 42 has a longitudinal hole 48 in communication with the longitudinal hole 46 of the seat block 41. The longitudinal hole 48 of the locating block 42 is provided in the inner wall thereof with an inclined guide block 49. The locating block 42 is provided in the outer surface thereof with a horizontal round protuberance 50. The braking block 43 is provided at the bottom end thereof with an expanded stop piece 51. The braking block 43 is fitted into the longitudinal recovering spring 45 before being put into the longitudinal holes 46 and 48 such that the top end of the braking block 43 is jutted out of the top end of the seat block 41, and that the top end of the braking block 43 is fastened with the two cords 34 and 341. The braking block 43 is further provided at the top end thereof with a retaining hook 52. The braking block 43 is still further provided with an inclined guide slot 53 corresponding in location to the inclined guide block 49 of the locating block 42. The seat block 41 is provided with a retaining slot 54 in which the retaining block 55 of the top tube 16 is retained. The horizontal round protuberance 50 of the locating block 42 is jutted out of the top tube 16 via the locating hole 161 of the top tube 16.

Figure 2:
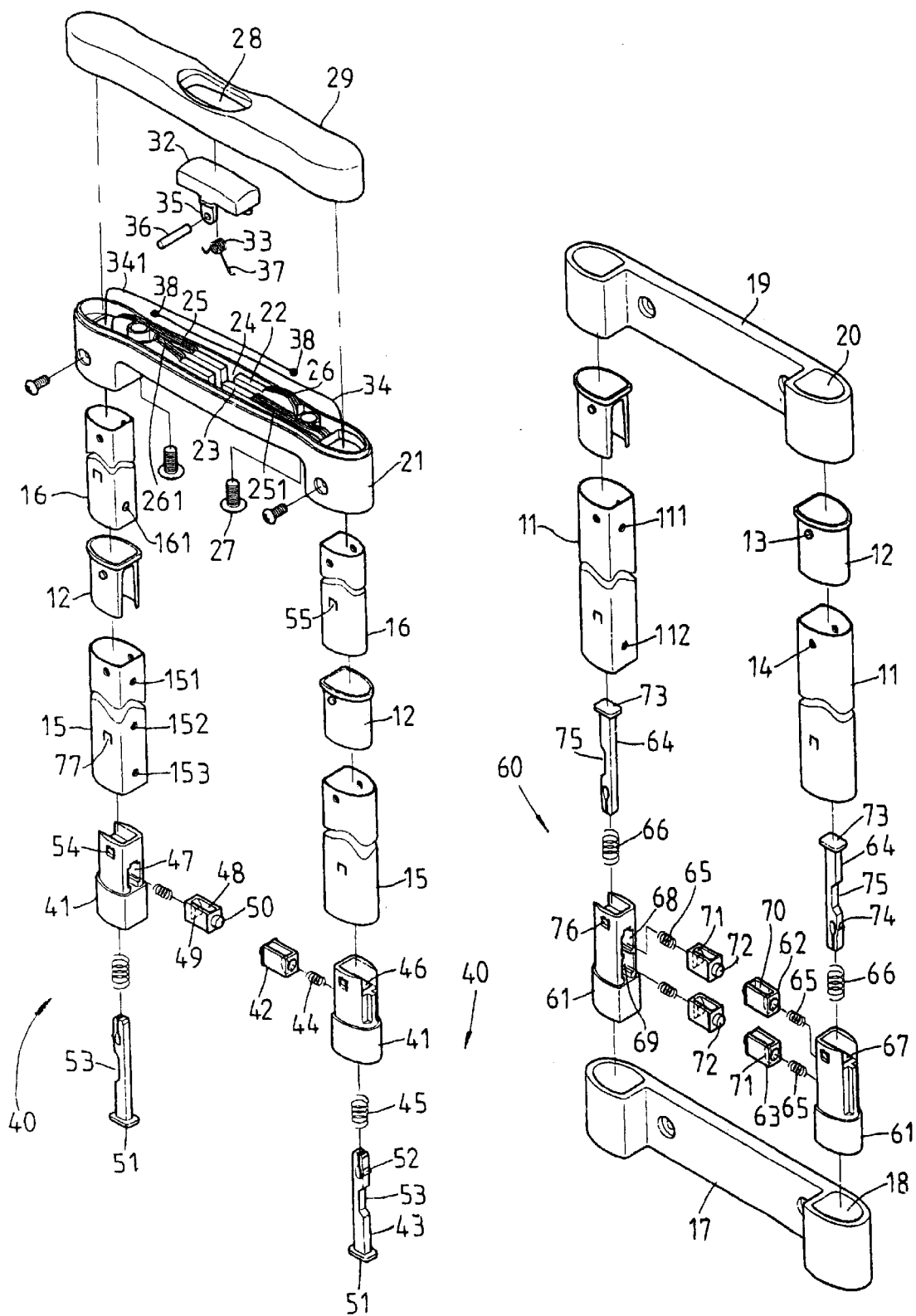
FIG. 2 shows an exploded view of the present invention.
Figure 6:
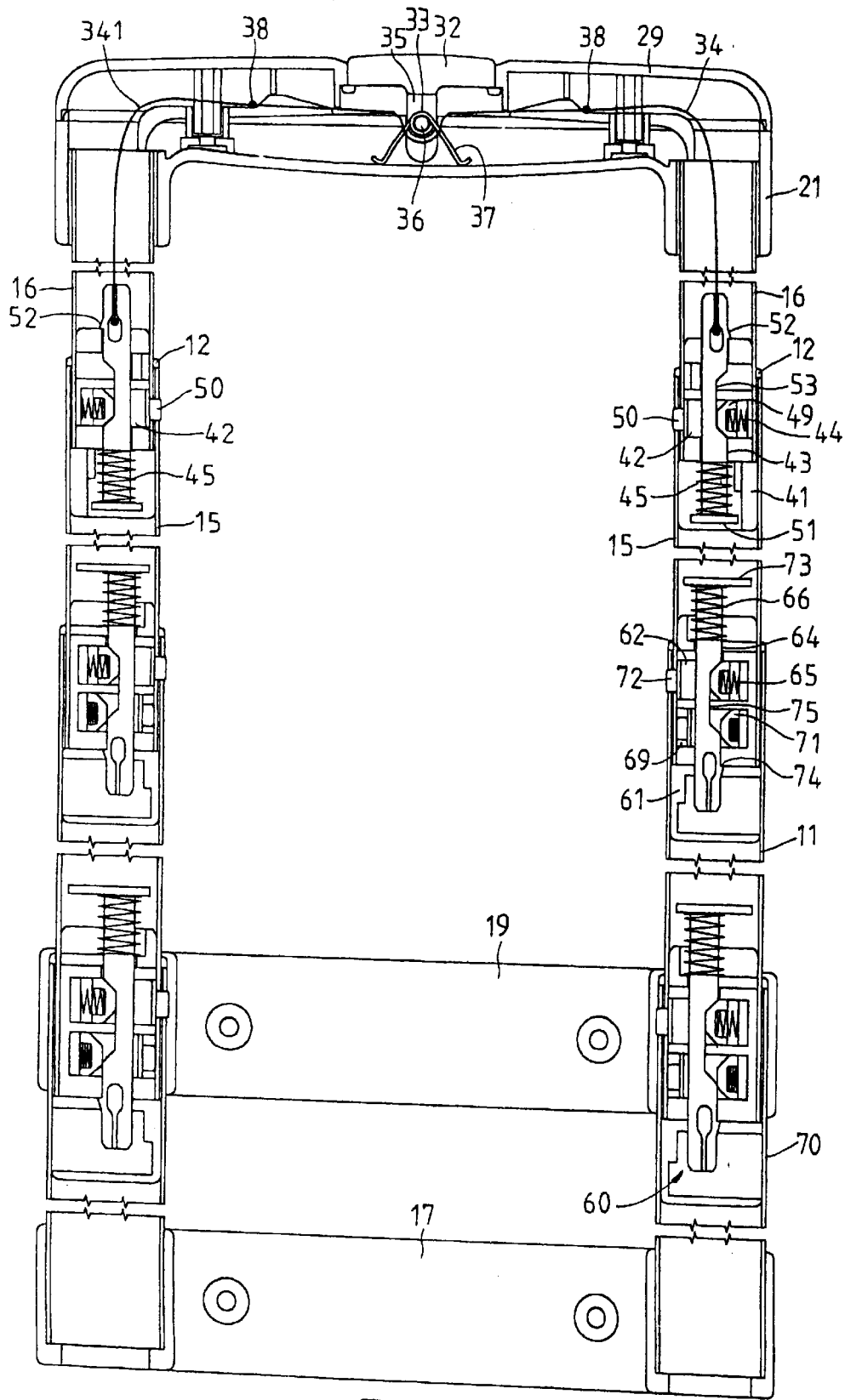
FIG. 6 shows a longitudinal sectional view of the preferred embodiment of the present invention.

The arresting device of the present invention further comprises two auxiliary control members 60, which are fitted into the bottom ends of the two bottom tubes 11, as shown in FIG. 6. The structural details of the two auxiliary control members 60 are shown in FIG. 2. The two auxiliary control members 60 are corresponding in construction to each other and are composed of a lower seat block 61, an upper locating block 62, a lower locating block 63, a lower braking block 64, two horizontal recovering springs 65, and one longitudinal recovering spring 66. The lower seat block 61 is provided with a long hole 67 and two horizontal slots 68 and 69 in which the two horizontal recovering springs 65 are located. The upper locating block 62 is provided with a through hole 70 in communication with the long hole 67 of the lower seat block 61. The through hole 70 is provided in the inner wall thereof with an inclined protrusion 71. The lower locating block 63 is similarly provided with a through hole 70 in communication with the long hole 67 of the lower seat block 61. The through hole 70 of the lower locating block 63 is provided in the inner wall thereof with an inclined protrusion 71. The upper and the lower locating blocks 62 and 63 are respectively provided in the outer side thereof with a horizontal protrusion 72. The lower braking block 64 is provided at the top end thereof with an expanded seat piece 73. The lower braking block 64 is fitted into the longitudinal recovering spring 66 such that the bottom end of the lower braking block 64 is jutted out of the bottom end of the lower seat block 61 via the long hole 67 and the through holes 70. The lower braking block 64 is further provided with a retaining protrusion 74, an inclined guide slot 75 corresponding in location to the inclined protrusion 71 of the through holes 70 of the upper and the lower locating blocks 62 and 63. The lower seat block 61 is provided with a retaining slot 76, which is engaged with the retaining piece 77 of the middle tube 15. The seat piece 73 of the lower braking block 64 faces the bottom of the seat block 41 of the arresting device 40.

Figure 3:
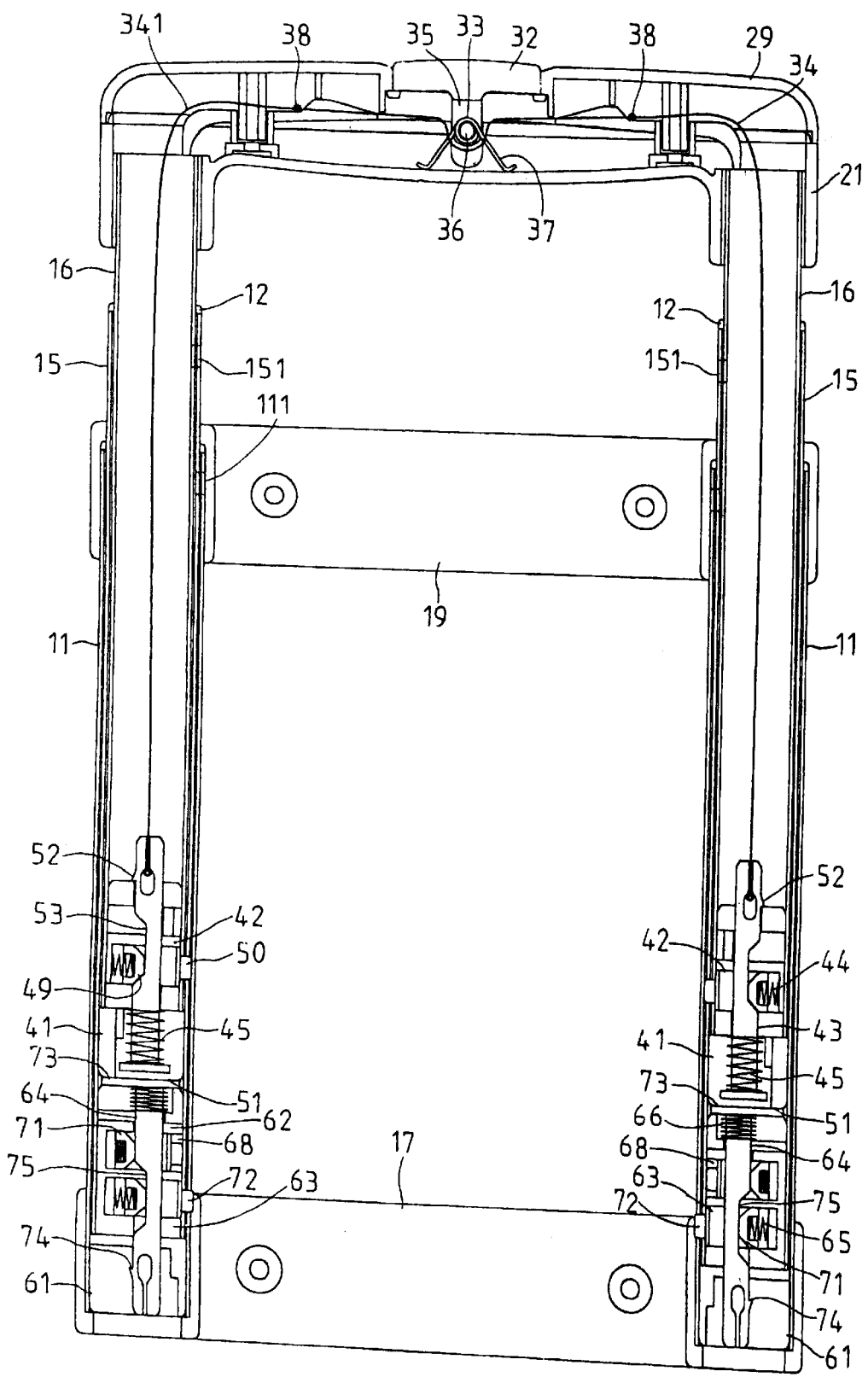
FIG. 3 shows a longitudinal sectional view of the present invention in combination.
Figure 4:
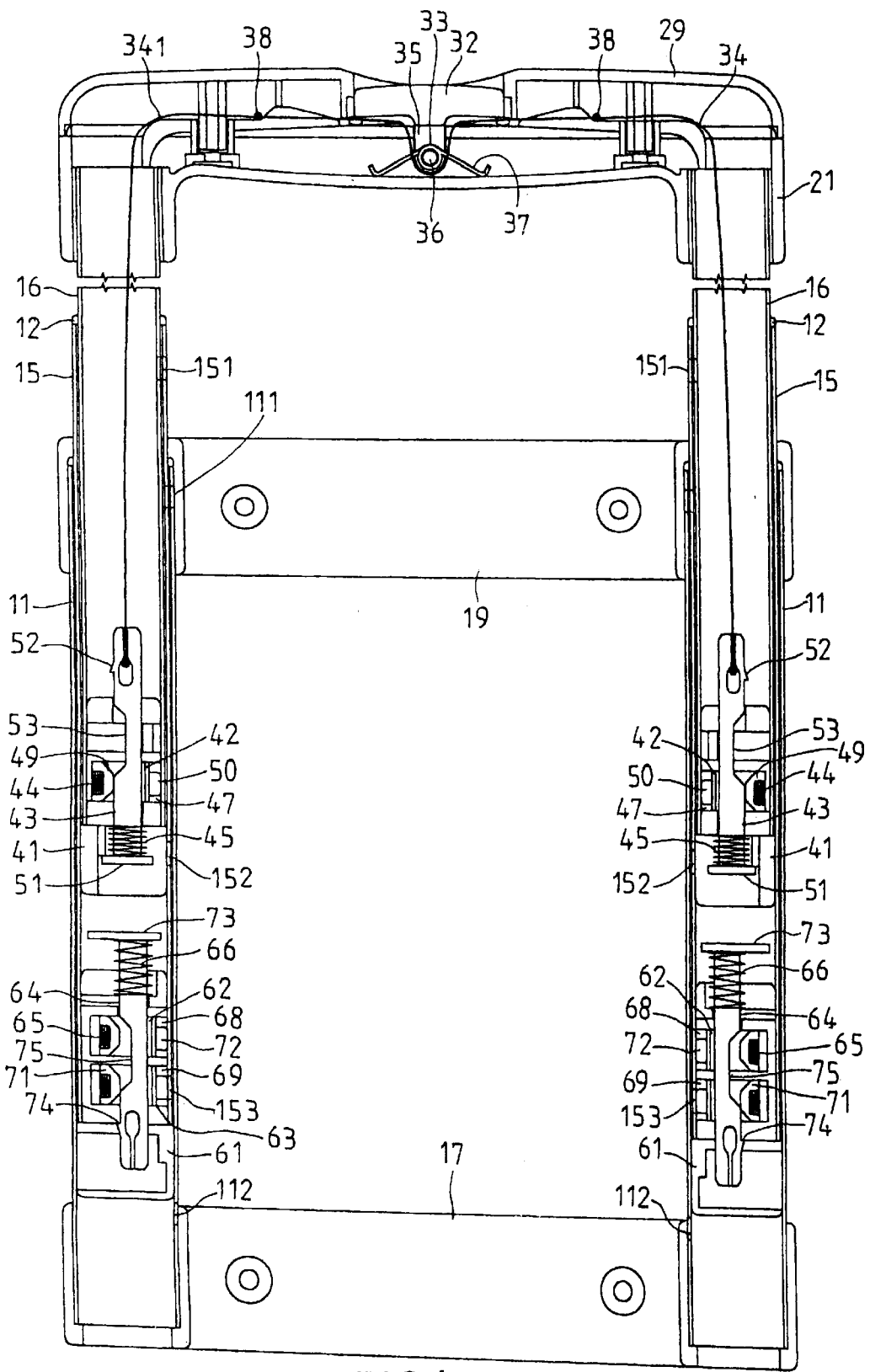
FIG. 4 shows a longitudinal sectional view to illustrate the present invention in operation.

As shown in FIGS. 2, 3, and 4, when the pull rod 10 of the present invention is completely retracted, the top tubes 16 and the middle tubes 15 are retracted into the bottom tubes 11. In the meantime, the lower braking block 64 of the auxiliary control members 60 is pressed by the seat block 41 of the main control members 40. The upper locating block 62 is retracted horizontally, whereas the lower locating blocks 63 are extracted horizontally such that the horizontal protrusions 72 of the lower locating blocks 63 are retained in the locating hole 153 of the middle tube 15 and the locating hole 112 of the bottom tube 11. The horizontal round protuberances 50 of the locating blocks 42 of the main control member 40 are retained respectively in the locating hole 161 of the top tube 16 and the locating hole 152 of the middle tube 15. As a result, the top tubes 16 and the middle tubes 15 can not be extracted.

Figure 5:
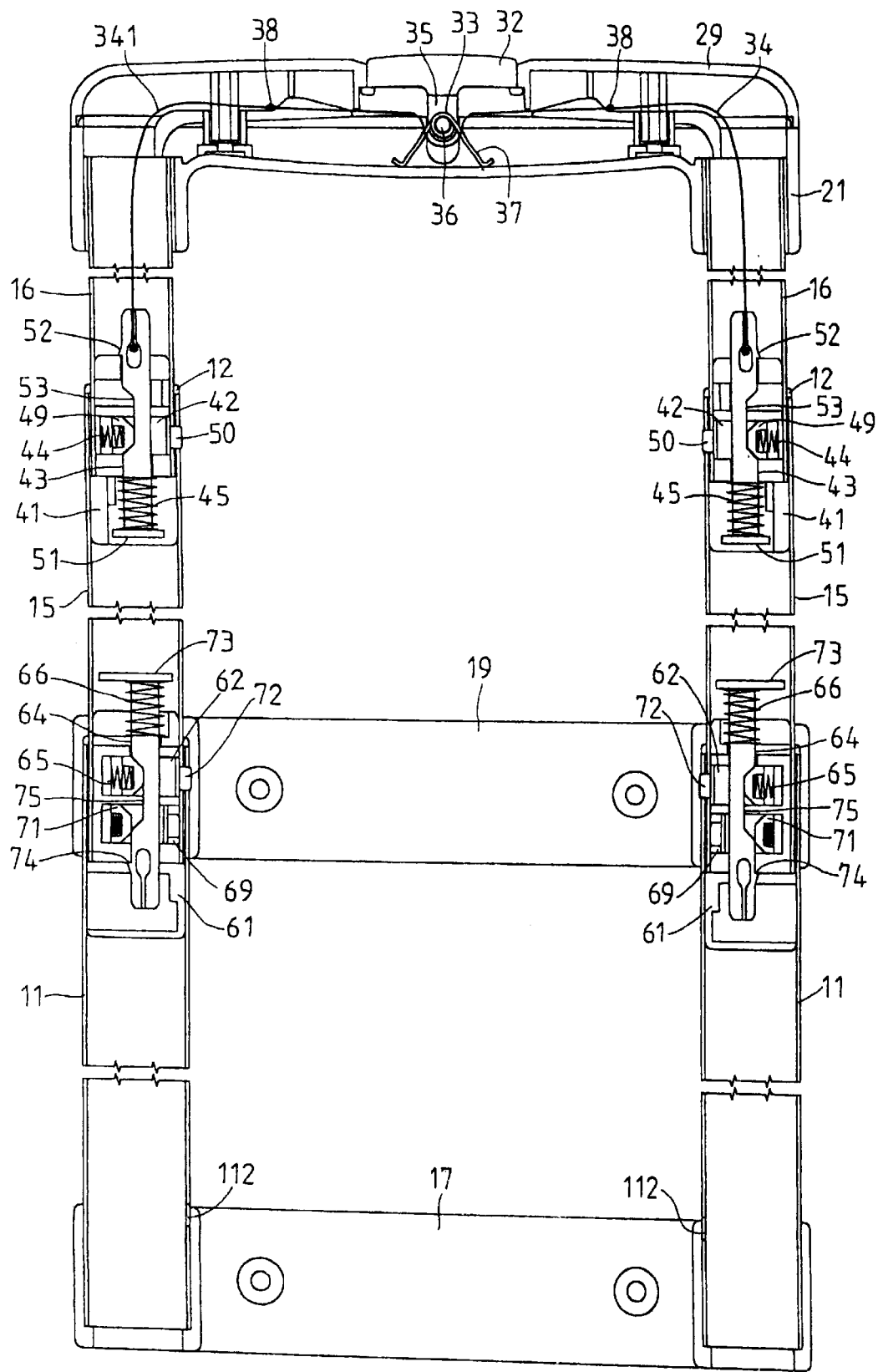
FIG. 5 shows another longitudinal sectional view to illustrate the present invention in operation.

As shown in FIGS. 4 and 5, before the pull rod 10 of the present invention is extracted, the press button 32 of the handle 21 must be first pressed so as to activate the protruded piece 35 of the press button 32 to actuate the cantilever spring 33 such that the two pull cords 34 and 341 are pulled upwards in the top tubes 16, and that the braking blocks 43 of the main control members 40 are caused to displace upwards, thereby resulting in the disengagement of the horizontal round protuberances 50 of the locating blocks 42 with the locating holes 152 of the middle tubes 15. As a result, the top tubes 16 can be pulled upwards by the handle 21. In the meantime, the seat blocks 41 of the main control members 40 are caused to displace upwards along with the top tubes 16. The lower braking block 64 is forced by the elastic force of the longitudinal recovering spring 66 to displace upwards such that the horizontal protrusion 72 of the lower locating block 63 is disengaged with the locating hole 112 of the bottom tube 11. As the pull rod 10 is completely extracted, the top tubes 16 and the middle tubes 15 are located by the main control members 40 of the arresting device, whereas the middle tubes 15 and the bottom tubes 11 are located by the auxiliary control members 60 of the arresting device.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claim.

I claim:

1. An expandable pull rod assembly for luggage, the assembly comprising:

two bottom tubes of a hollow construction and provided with a locating tube which is provided with a locating protrusion located in a through hole of a top end of said bottom tubes, said bottom tubes further provided respectively at a top end thereof with a locating hole;

two middle tubes of a hollow construction and fitted into said bottom tubes such that top ends of said middle tubes are jutted out of top ends of said bottom tubes, and that the top ends of said middle tubes are fitted into said locating tubes, said two middle tubes provided with a plurality of locating holes;

two top tubes of a hollow construction and fitted into said middle tubes such that top ends of said top tubes are jutted out of the top ends of said middle tubes, said top tubes provided respectively with a locating hole;

a bottom base disposed horizontally and provided at both ends thereof with a fitting port for engaging a bottom end of said bottom tubes;

a middle base disposed horizontally and provided at both ends thereof with a longitudinally-oriented opening for receiving the top end of said bottom tubes in such a manner that said middle tubes and said top tubes are jutted out of said longitudinally-oriented opening;

a handle of an inverted U-shaped construction and provided with two arms which are fastened with said two top tubes, said handle provided in an interior thereof with two protruded pieces, two guide slots, and two receiving slots, said handle further provided with a cover fastened therewith by a plurality of screws, said cover provided with a through hole, said handle further provided with a pressing device which is disposed in said receiving slots of said handle such that said pressing device is partially jutted out of said cover via said through hole of said cover;

said top tubes, said middle tubes, and said bottom tubes being located by an arresting device at such time when said expandable pull rod is extracted;

wherein said pressing device of said handle is composed of a press button, a cantilever spring, and two pull cords, said press button provided with two protruded pieces for pivoting said cantilever spring by a pivoting pin, said pull cords provided with a spherical end which is received in said receiving slot of said handle such that said spherical end is extended into said top tube, said press button and said cantilever spring being disposed in said receiving slots of said handle such that said pull cords are pressed by said cantilever spring, and that two cantilevers of cantilever spring press against a bottom of said receiving slots, and further that said press button is partially jutted out of said cover via said through hole of said cover, and still further that said arresting device is triggered to release said top tubes, said middle tubes and said bottom tubes at the time when said press button of said pressing device of said handle is activated; and wherein said arresting device is formed of two main control members and two auxiliary control members, said two main control members composed of a seat block, a locating block, a braking block, a horizontal recovering spring, and a longitudinal recovering spring, said seat block provided in an interior thereof with a longitudinal hole, and in each of two opposite sides thereof with a horizontal slot hole in which said horizontal recovering spring and said locating block are disposed, said locating block having a longitudinal hole in communication with said longitudinal hole of said seat block, said longitudinal hole of said locating block provided in an inner wall thereof with a horizontal round protuberance, said braking block provided at a bottom end thereof with a stop piece, said braking block being fitted into said longitudinal recovering spring and said longitudinal holes of said seat block and said locating block such that a top end of said braking block is jutted out of a top end of said seat block, and that the top end of said braking block is fastened with said pull cords, said braking block further provided with a retaining hook, an inclined guide slot corresponding in location to said inclined guide block of said locating block, said seat block provided with a retaining slot for retaining said retaining block of said top tubes, said horizontal round protuberance of said locating block being jutted out of said top tube via said locating hole of said top tube, said two auxiliary control members composed of a lower seat block, an upper locating block, a lower locating block, a lower braking block, two horizontal recovering springs, and one longitudinal recovering spring, said lower seat block provided with a long hole and two horizontal slots for locating said two horizontal recovering springs, said upper locating block provided with a through hole in communication with said long hole of said lower seat block, said lower locating block provided with a through hole in communication with said long hole of said lower seat block, said through hole of said lower locating block provided in an inner wall thereof with an inclined protrusion, said upper and said lower locating blocks provided respectively in an outer side thereof with a horizontal protrusion, said lower braking block provided at a top end thereof with a seat piece, said lower braking block being fitted into said longitudinal recovering spring such that a bottom end of said lower braking block is jutted out of the bottom end of said lower seat block via said long hole of said lower seat block and said through holes of said upper locating block and said lower locating block, said lower braking block further provided with a retaining protrusion, an inclined guide slot corresponding in location to said inclined protrusion of said through holes of said upper and said lower locating blocks, said lower seat block provided with a retaining slot which is engaged with said retaining piece of said middle tubes.

\* \* \* \* \*